W. D. MAYNARD.
PULLEY FASTENER.
APPLICATION FILED JUNE 13, 1910.

1,064,663.

Patented June 10, 1913.
2 SHEETS—SHEET 1.

WITNESSES
C. A. Brouk
James R. Dowr

INVENTOR
Wyllys D. Maynard.

By
[signature]
Attorney.

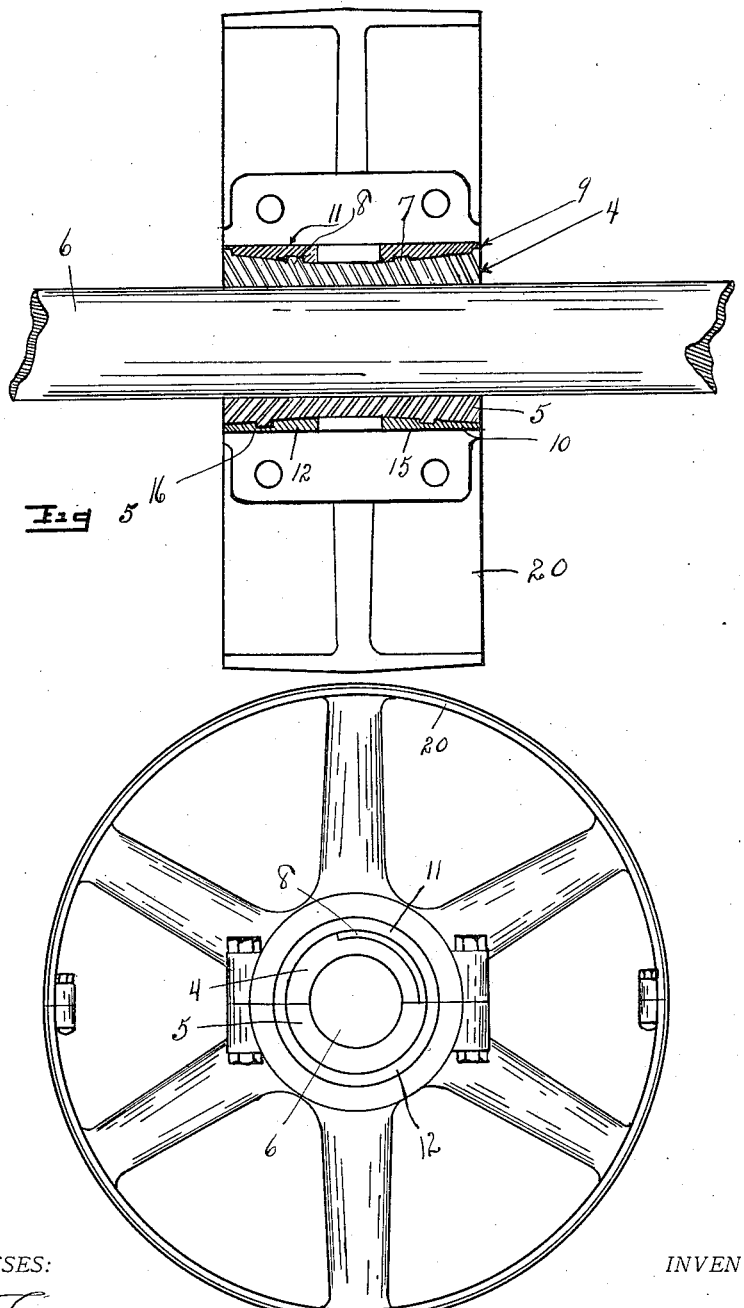

UNITED STATES PATENT OFFICE.

WYLLYS D. MAYNARD, OF UTICA, NEW YORK, ASSIGNOR OF ONE-FOURTH TO LEAN F. SNYDER AND ONE-FOURTH TO CHARLES W. HILL, OF UTICA, NEW YORK.

PULLEY-FASTENER.

1,064,663.

Specification of Letters Patent. Patented June 10, 1913.

Application filed June 13, 1910. Serial No. 566,588.

*To all whom it may concern:*

Be it known that I, WYLLYS D. MAYNARD, a citizen of the United States, residing in Utica, in the county of Oneida and State of New York, have invented certain new and useful Improvements in Pulley-Fasteners, of which the following is a specification.

To effectually secure a pulley to a shaft is not an easy matter to accomplish. In any event, it appears that such devices that exist in the prior art, tax the shaft to such an extent as to render the same, quite frequently, worthless.

An object of the present improvement is to rely on the shaft and the pulley, equally for the affixment of the latter to the former, positively, at will, and to effect a release, respectively, of the two members without mutilation of either.

Other objects apparent in the course of the reading of this specification also form a part of this case.

Figure 1:
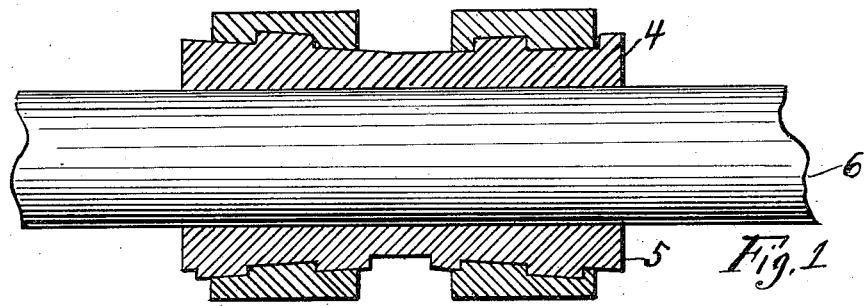
Figure 2:
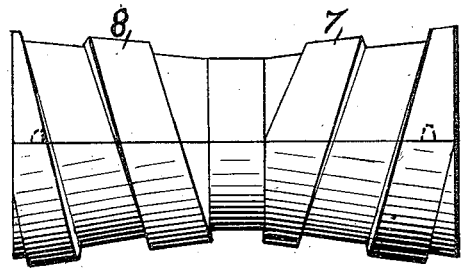
Figures 3, 4:
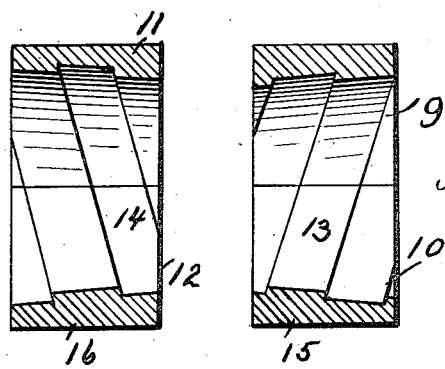

In the drawings, forming a part of this specification, Figure 1 illustrates in elevation and in section a portion of a shaft, and means for gripping a pulley thereon; Fig. 2 illustrates the shaft-gripping elements, and Fig. 3 is a plan view of a collar, looking down onto the inside thereof, employed in connecting the pulley to the shaft. Fig. 4 is a plan view of a collar corresponding to the collar shown in Fig. 3, and likewise looking down onto the inside of said collar. Fig. 5 shows one half of a pulley mounted upon a shaft by means of the bushing and collars, illustrated in section. Fig. 6 is a side elevation of a pulley shown mounted upon a shaft by means of the bushing and collars.

In these views, similar characters of reference indicate similar portions.

A bushing is formed of two sections, 4, and 5, and this bushing surrounds the shaft 6. It may be stated, however, that, if desired, the bushing may constitute a unitary member which is split in coincidence with its elongated axis, and in that way will serve the same purpose. The exterior of this bushing is provided with two sets of spirally-arranged members 7, and 8, progressing in opposite directions from the center of the bushing. This arrangement, however, obviously need not be so, for the same may be varied to meet mechanical demands. As may be observed, also, the exterior wall of the bushing is tapered in opposite directions from the substantially central portion of the bushing, as may be seen in Fig. 2. Collars 9, 10, 11, and 12, are provided, and are formed with spirally-arranged grooves 13, and 14, to register with and coöperate with the members 7, and 8, on the bushing. These four members are placed, centrally, upon the bushing, and a pulley, 20, slipped over the outer walls 15, and 16, thereof. These walls are intended to frictionally engage with the wall of the bore of the pulley, and therefore; as the latter is rotated, with respect to the shaft, there will at once be a separating movement of the collars 9, and 10, and 11, and 12, respectively, away from the center of the shaft bushing. This will be accomplished through the instrumentality of the spirally-located members or threads 7 and 8 in the bushing on the shaft. As this movement takes place, the collars 9, 10, 11, and 12, will force their way along the tapered surface of the shaft bushing, and naturally spreading apart will more effectually impinge or grip the interior wall of the bore of the pulley. At the same time, this operation will cause the shaft bushing to more effectually hug the shaft, when it will be observed there is a dual grip upon the shaft and the interior wall of the bore of the pulley, which will hold the latter and the former unmovable, relatively, at will. This will also remain so as long as the rotation of the pulley and the shaft, relatively, are in the same direction. When it is desired to release the pulley from the shaft, the forcing of the shaft and the pulley in opposite directions will effect an automatic release without impairing the usefulness of any of the elements.

Having thus described this invention, I claim :—

1. In a pulley fastener, the combination with a shaft of a member to be keyed thereto, a bushing comprising two sections and having spirally arranged members mounted on said shaft, said sections formed to taper in opposite longitudinal directions from the central portion of said bushing, split collars having spiral grooves, mounted on said bushing, said grooves adapted to conform to the contour of said spiral members on said bushing, whereby the turning of said shaft will cause said collars to move in opposite directions longitudinally on said bushing and thereby cause said collars to expand to secure the member to said shaft.

2. In a pulley fastener of the character described, the combination with a shaft of a member to be secured thereto, a bushing comprising two sections and having spirally arranged members formed thereon, said sections formed to taper in opposite longitudinal directions from the central portion of said bushing, split collars having spiral grooves formed therein, mounted on said bushing, said grooves adapted to conform to the contour of said spiral members on said bushing, whereby the turning of said shaft will cause said collars to expand to secure the member to said shaft.

3. In a pulley fastener, the combination with a shaft of a member to be keyed thereto, a bushing mounted on said shaft, said bushing comprising two sections and having spirally arranged members formed thereon, said members progressing in opposite longitudinal directions from the central portion of said bushing, and split collars having spiral grooves, mounted on said bushing, said grooves adapted to conform to the contour of said spiral members on said bushing, whereby the turning of said shaft will cause said collars to expand to secure the pulley to a shaft.

4. In a pulley fastener, the combination with a shaft of a member to be keyed thereto, a split bushing mounted on said shaft, said bushing having ends tapering inwardly toward its central portion and spiral members arranged thereon, split collars having spiral grooves, mounted on said bushing, said grooves adapted to conform to the contour of said spiral members on said bushing, whereby the turning of said shaft will cause said collars to move in opposite directions on said bushing and thereby cause said collars to expand to automatically secure a pulley to a shaft.

Signed at Utica, in the county of Oneida, and State of New York, this 26" day of January, in the year of our Lord, 1910.

WYLLYS D. MAYNARD.

Witnesses:
FRED W. BARNACLO,
JAMES R. DOWN.

---

Copies of this patent may be obtained for five cents each, by addressing the "Commissioner of Patents. Washington, D. C."